United States Patent Office 3,140,287
Patented July 7, 1964

3,140,287
METHOD FOR PREPARING TETRAALKYL-3-OXOGLUTARIMIDES
Edward U. Elam, Kingsport, Tenn., assignor to Eastman Kodak Company, Rochester, N.Y., a corporation of New Jersey
No Drawing. Filed Aug. 16, 1962, Ser. No. 217,269
4 Claims. (Cl. 260—281)

This invention relates to the preparation of tetraalkyl-3-oxoglutarimides, and more particularly to the preparation of 2,2,4,4-tetraalkyl-3-oxoglutarimides from 2,2,4,4-tetraalkyl-3-hydroxy-3-alkenoic acid β-lactones. The compounds have the general formula

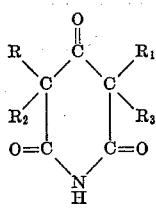

wherein R, $R_1$, $R_2$ and $R_3$ each represents a lower alkyl group of 1 to 4 carbon atoms, straight or branch-chained, e.g., R, $R_1$, $R_2$ and $R_3$ each may be methyl groups or R and $R_1$ are ethyl when $R_2$ and $R_3$ are butyl groups, etc.

Representative compounds are 2,2,4,4-tetramethyl-3-oxoglutarimide

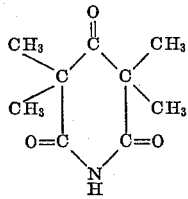

2,4-dibutyl-2,4-diethyl-3-oxoglutarimide

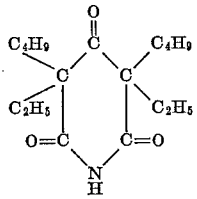

2,4-dimethyl-4-methyl-4-butyl-3-oxoglutarimide

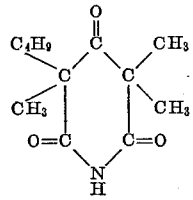

The compounds are useful as dye intermediates, pharmaceuticals and plasticizers for synthetic polymers. The compounds do not undergo enolization; therefore, their properties, such as low acidity, are separate and distinct from related compounds such as 2,2,4-trialkyl-3-oxoglutarimides wherein the 3-oxo group enolizes and behaves more like a phenolic hydroxyl group.

The tetraalkyl-3-oxoglutarimides having the above structures are prepared by reaction of urea with β-lactones having the general formula

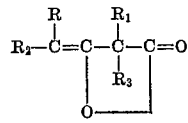

wherein R, $R_1$, $R_2$ and $R_3$ are as above. The reaction is carried out as described in more detail below in the presence of inert organic solvents, particularly basic solvents such as pyridine, and preferably also in the presence of a weakly alkaline catalyst such as potassium acetate.

Amides which are also formed in the reaction are readily isolated from the imides by washing. The β-lactones are prepared in the manner described by Hasek, Clark, Elam and Martin, J. Org. Chem 27 60 (1962) from the appropriate dialkyl ketene.

The following examples will serve to illustrate my invention.

*Example 1*

A mixture of 30 g. (0.5 mole) of urea, 140 g. (1 mole) of 3-hydroxy-2,2,4-trimethyl-3-pentenoic acid β-lactone,

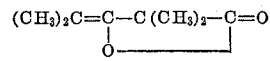

and 200 ml. of pyridine is stirred and refluxed gently overnight. Crystals which form on the walls of the flask during the early part of the reaction gradually dissolve and the mixture becomes homogeneous. The product is poured over two liters of crushed ice and filtered. The yield of 2,2,4,4-tetramethyl-3-oxoglutarimide M.P. 203–207° C. is 32 g.

*Example 2*

A mixture of 5 g. of potassium acetate, 30 g. of urea, 200 ml. of pyridine, and 140 g. of 3-hydroxy-2,2,4-trimethyl-3-pentenoic acid β-lactone is stirred and refluxed overnight as described in Example 1. The reaction mixture, which contains a good deal of solid, is poured over crushed ice. The crude 2,2,4,4-tetramethyl-3-oxoglutarimide which separates is washed thoroughly with water and dried. The yield of crude product melting from 192–203° C. is 71 g. (78% of expected ½ mole). This is recrystallized from methanol to give 37 g. of pure imide, M.P. 206–9° C.

*Analysis.*—Calcd. for $C_9H_{13}NO_3$: C, 59.0; H, 7.1; N, 7.7. Found: C, 59.1; H, 7.2; N, 7.7.

The aqueous mother liquor from precipitation of the 2,2,4,4-tetramethyl-3-oxoglutarimide is evaporated to dryness on the steam bath. The residual crude 2,2,4-trimethyl-3-oxovaleramide melts from 93–110° C. and weighs 71 g. (90% yield of expected ½ mole). This is recrystallized from water, giving pure ketoamide, M.P. 106–10° C. The infrared spectrum of this material is identical with that of an authentic sample.

*Analysis.*—Calcd. for $C_8H_{11}NO_2$: N, 8.9. Found: N, 9.1.

*Example 3*

Example 2 is repeated, but with substitution of 252 g. of 2-butyl-2,4-diethyl-3-hydroxy-3-octenoic acid β-lactone for the 3-hydroxy-2,2,4-trimethyl-3-pentenoic acid β-lactone. The yield of 2,4-dibutyl-2,4-diethyl-3-oxoglutarimide is 50% and that of 2-butyl-2,4-diethyl-3-oxooctanamide was 60%.

As illustrated above, the reaction is carried out in inert organic solvent media. Tertiary amines boiling between about 100 to 200° C. such as pyridine, morpholine, triisopropylamine, triisobutylamine, etc. are preferred solvents. Other solvents inert toward the β-lactones and urea may be used, e.g., ethers such as dibutyl ether or dioxane; esters such as ethyl acetate and hydrocarbons including toluene and chlorinated hydrocarbons such as chlorobenzene.

In addition to the inert organic solvent, it is preferred to use a mildly alkaline catalyst in the reaction mixture, in an amount of the order of 2 to 10% based on the lactone; preferably a salt of a strong base and a weak organic acid, including salts of metals of Groups 1 and 2 of the Periodic Table with a weak organic acid, e.g., calcium, sodium, potassium and lithium acetates, butyrates, isobutyrates and stearates. The reaction time and temperature will vary with the particular lactone in use and temperature of from about 20 to 200° C. or higher can be used, preferably 100–150° C. and reaction times of from about 1 to 24 hours.

The proportion of urea to the β-lactone in the reaction mixture may be varied appreciably from about 0.5 mole urea per mole lactone to 0.5 mole urea per 10 moles lactone. However, an excess of either reactant may be used.

The invention has been described in considerable detail with particular reference to certain preferred embodiments thereof, but it will be understood that variations and modifications can be effected within the spirit and scope of the invention as described hereinabove, and as defined in the appended claims.

What I claim is:

1. The method of preparing 2,2,4,4-tetraalkyl-3-oxo-glutarimides which comprises heating a mixture of urea and a β-lactone of the formula

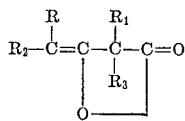

wherein $R$, $R_1$, $R_2$ and $R_3$ each represents a lower alkyl group, in the presence of an inert organic solvent.

2. The method of preparing 2,2,4,4-tetramethyl-3-oxo-glutarimide which comprises heating a mixture of urea and 3-hydroxy-2,2-4-trimethyl-3-pentenoic acid β-lactone in the presence of pyridine.

3. The method of preparing 2,4-dibutyl-2,4-diethyl-3-oxoglutarimide which comprises heating a mixture of urea and 2-butyl-2,4-diethyl-3-hydroxy-3-octenoic acid β-lactone in the presence of pyridine and potassium acetate.

4. The process of claim 1 wherein the organic solvent is a tertiary amine.

References Cited in the file of this patent

UNITED STATES PATENTS

| | | |
|---|---|---|
| 2,678,315 | Frederick | May 11, 1954 |
| 3,062,836 | Martin | Nov. 6, 1962 |

FOREIGN PATENTS

| | | |
|---|---|---|
| 851,674 | Great Britain | Oct. 19, 1960 |